(12) United States Patent
Masuda et al.

(10) Patent No.: US 11,555,967 B2
(45) Date of Patent: Jan. 17, 2023

(54) FIBER CONNECTION STRUCTURE PROVIDED WITH OPTICAL CONNECTOR, MODULE, AND ASSEMBLY

(71) Applicant: SUMITOMO ELECTRIC INDUSTRIES, LTD., Osaka (JP)

(72) Inventors: Kazuya Masuda, Osaka (JP); Masakazu Shigehara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/273,383

(22) PCT Filed: Oct. 26, 2018

(86) PCT No.: PCT/JP2018/039917
§ 371 (c)(1),
(2) Date: Mar. 4, 2021

(87) PCT Pub. No.: WO2020/084774
PCT Pub. Date: Apr. 30, 2020

(65) Prior Publication Data
US 2021/0333484 A1    Oct. 28, 2021

(51) Int. Cl.
*G02B 6/38* (2006.01)
*G02B 6/36* (2006.01)
(Continued)

(52) U.S. Cl.
CPC ......... *G02B 6/3885* (2013.01); *G02B 6/3897* (2013.01); *G02B 6/3644* (2013.01); *G02B 6/40* (2013.01); *G02B 6/4401* (2013.01)

(58) Field of Classification Search
None
See application file for complete search history.

(56) References Cited

U.S. PATENT DOCUMENTS 8,009,959 B2    8/2011  Barnes et al.
8,251,591 B2    8/2012  Barnes et al.
(Continued)

FOREIGN PATENT DOCUMENTS

| JP | 2016-501383 A | 1/2016 |
| WO | 2011/053409 A1 | 5/2011 |
| WO | 2014/078261 A1 | 5/2014 |

OTHER PUBLICATIONS

Jan. 22, 2019 International Search Report issued in International Patent Application No. PCT/JP2018/039917.

*Primary Examiner* — Michael Stahl
(74) *Attorney, Agent, or Firm* — Oliff PLC

(57) ABSTRACT

An optical connector-equipped fiber connection structure according to an embodiment includes at least three groups including two or more optical fibers adjacent to each other. In the groups, two or more of the optical fibers extend from a first multi-core connector to a second multi-core connector without intersecting with each other. Optical fibers of two groups in the at least three groups intersect with each other in a midway point going from the first multi-core connector to the second multi-core connector. Optical fibers of groups other than the two groups extend from the first multi-core connector to the second multi-core connector without intersecting with the other optical fibers extending from the first multi-core connector.

34 Claims, 9 Drawing Sheets

(51) Int. Cl.
 *G02B 6/40* (2006.01)
 *G02B 6/44* (2006.01)

(56) References Cited

U.S. PATENT DOCUMENTS

| | | | | |
|---|---|---|---|---|
| 2008/0175550 | A1* | 7/2008 | Coburn | G02B 6/4453 385/134 |
| 2009/0180737 | A1* | 7/2009 | Burnham | G02B 6/4453 385/59 |
| 2010/0098428 | A1* | 4/2010 | Barnes | G02B 6/4453 385/71 |
| 2010/0195955 | A1* | 8/2010 | Burnham | G02B 6/3897 385/24 |
| 2010/0322580 | A1* | 12/2010 | Beamon | G02B 6/4452 385/135 |
| 2014/0140660 | A1* | 5/2014 | Buff | G02B 6/3885 385/59 |
| 2014/0341509 | A1 | 11/2014 | Coleman et al. | |
| 2019/0243084 | A1* | 8/2019 | Billman | G02B 6/3897 |

* cited by examiner

FIBER CONNECTION STRUCTURE PROVIDED WITH OPTICAL CONNECTOR, MODULE, AND ASSEMBLY

TECHNICAL FIELD

An aspect of the present disclosure relates to an optical connector-equipped fiber connection structure, a module, and an assembly.

BACKGROUND ART

Patent Literature 1 describes a high-speed optical transmission system using multi-core connectors. The high-speed optical transmission system includes a pair of active assembly connectors, a pair of patch cord connectors having multi-fiber ferrules, and a harness. At one end of the harness, one 24-core patch cord connector is provided, and at the other end of the harness, two 12-core patch cord connectors are provided.

From 24 ports of the 24-core patch connector, optical fibers individually extend, and these optical fibers are individually connected to 12 ports of each of the 12-core patch connectors. A plurality of optical fibers extending from ports 1 to 6 of the 24-core patch connector and a plurality of optical fibers extending from ports of 19 to 24 of the 24-core patch connector respectively extend to the 12-core patch connectors without intersecting with each other.

On the other hand, a plurality of optical fibers extending from ports 7 to 18 of the 24-core patch connector reaches the 12-core patch connector in a state in which the positions of the ports are inverted to each other. Specifically, optical fibers extending from ports 7 to 12 of the 24-core patch connector respectively reach ports 6 to 1 of the 12-core patch connector, and optical fibers extending from ports 13 to 18 of the 24-core patch connector respectively reach ports 12 to 7 of the 12-core patch connector.

Patent Literature 2 describes a patch cord. The patch cord includes one 24-core ferrule and two 12-core ferrules. To one of the two 12-core ferrules, 12 ports, a part of the 24-core ferrule, are connected through a harness, and to the other of the two 12-core ferrules, 12 ports, the remaining ports of the 24-core ferrule are connected through the harness.

The harness is composed of 24 optical fibers. A plurality of optical fibers extending from ports 1 to 6 of the 24-core patch connector and a plurality of optical fibers extending from ports of 19 to 24 of the 24-core patch connector respectively extend to the 12-core patch connectors without intersecting with each other. On the other hand, a plurality of optical fibers extending from ports 7 to 18 of the 24-core patch connector reaches the 12-core patch connector in a state in which the positions of the ports are inverted to each other. That is, Cited Literature 2 describes the optical fiber connection structure similar to Cited Literature 1.

CITATION LIST

Patent Literature

Patent Literature 1: U.S. Pat. No. 8,009,959
Patent Literature 2: U.S. Pat. No. 8,251,591

SUMMARY OF INVENTION

An optical connector-equipped fiber connection structure according to an aspect of the present disclosure includes a first multi-core connector, a second multi-core connector, and a plurality of optical fibers configured to connect the first multi-core connector to the second multi-core connector, wherein the plurality of optical fibers has at least three groups including two or more of the optical fibers adjacent to each other in the first multi-core connector, in the groups, two or more of the optical fibers extend from the first multi-core connector to the second multi-core connector without intersecting with each other, the optical fibers of the two groups in the at least three groups intersect with each other in a midway point going from the first multi-core connector to the second multi-core connector, and the optical fibers of the group other than the two groups extend from the first multi-core connector to the second multi-core connector without intersecting with other optical fibers extending from the first multi-core connector.

An optical connector-equipped fiber connection structure according to another aspect of the present disclosure includes a first multi-core connector, a second multi-core connector, and a plurality of optical fibers configured to connect the first multi-core connector to the second multi-core connector. The plurality of optical fibers is arrayed in two groups in the second multi-core connector, wherein the plurality of optical fibers has at least four groups including two or more of the optical fibers adjacent to each other in the first multi-core connector, optical fibers of a first group and a fourth group in the first multi-core connector are arrayed at equal positions in groups different from each other in the second multi-core connector, and optical fibers of a second group and a third group in the first multi-core connector are arrayed at equal positions in groups different from each other in the second multi-core connector.

A module according to an aspect of the present disclosure includes a first adapter having a first multi-core connector of optical connector-equipped fiber connection structure connected, a first wall surface exposing and supporting the first adapter, a second adapter having a second multi-core connector of the optical connector-equipped fiber connection structure connected, a second wall surface exposing and supporting the second adapter, and the above-described optical connector-equipped fiber connection structure configured to optically couple the first adapter to the second adapter.

An assembly according to an aspect of the present disclosure includes a plurality of above-described modules and a polarity C wiring structure configured to optically couple the plurality of modules to each other.

DESCRIPTION OF EMBODIMENTS

Figure 1:
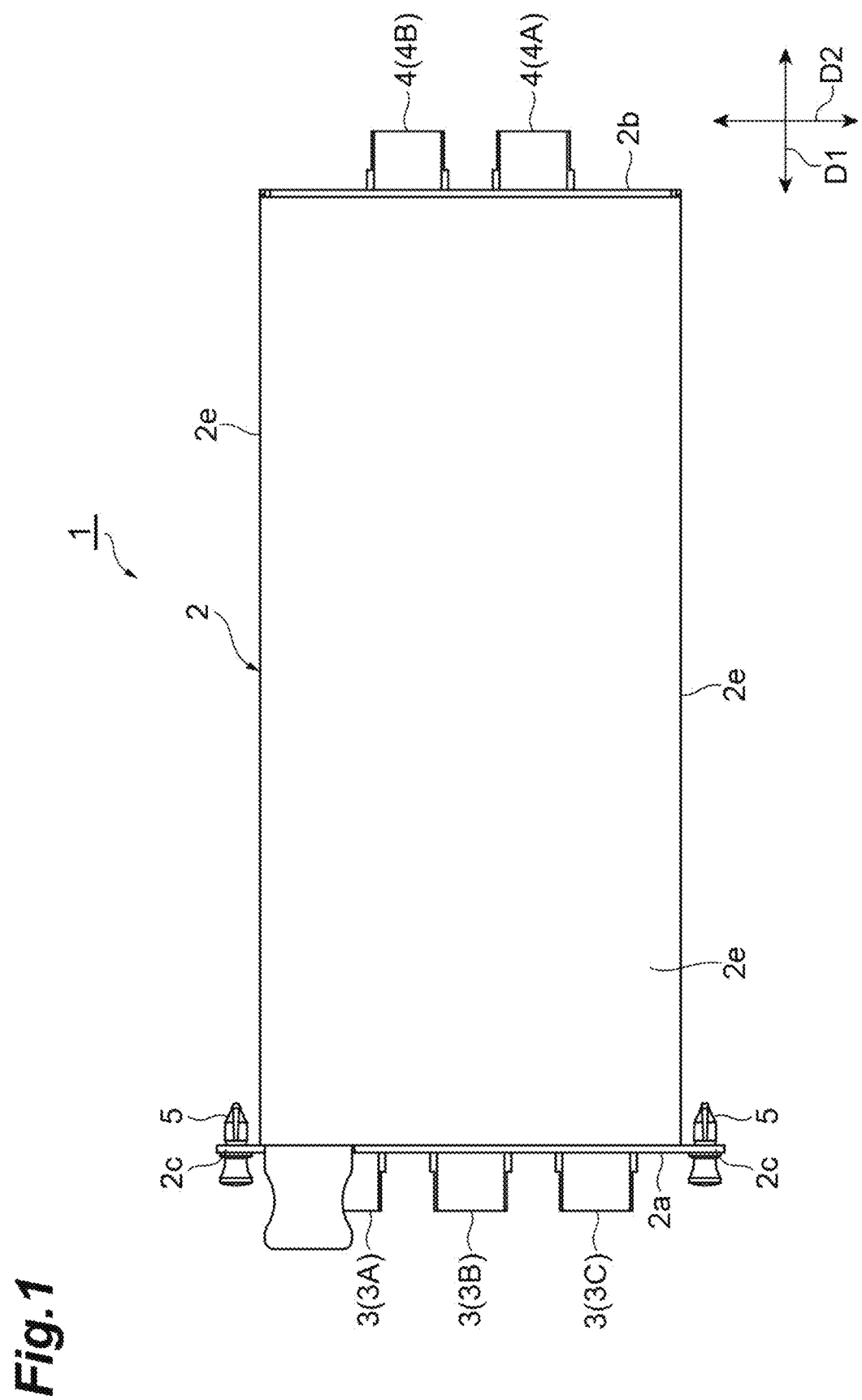
FIG. 1 is a plan view showing a module according to a first embodiment.

As described above, in the optical connector-equipped connection structure including a plurality of multi-core connectors and a plurality of optical fibers connecting the plurality of multi-core connectors to each other, the configuration is prone to be complicated because a large number of optical fibers extend from one multi-core connector to the other multi-core connector. As described above, in the case in which a plurality of optical fibers extending from the ports of one multi-core connector reaches the other multi-core connector in a state in which the positions of the ports are inverted to each other, the positions of a large number of optical fibers are inverted, and thus there is a concern that a twist produced on the optical fiber is increased. In the case in which a twist produced on a large number of optical fibers is large, there is a concern that the housing properties of the optical fiber are reduced.

An aspect of the present disclosure is to provide an optical connector-equipped fiber connection structure, a module, and an assembly that can simplify configurations and that can improve housing properties with a twist of an optical fiber suppressed.

According to an aspect of the present disclosure, configurations can be simplified and housing properties can be improved with a twist of an optical fiber suppressed.

First, the contents of embodiments of the present disclosure will be described in enumeration. An optical connector-equipped fiber connection structure according to an embodiment includes a first multi-core connector, a second multi-core connector, and a plurality of optical fibers configured to connect the first multi-core connector to the second multi-core connector. The plurality of optical fibers has at least three groups including two or more of the optical fibers adjacent to each other in the first multi-core connector. In the groups, two or more of the optical fibers extend from the first multi-core connector to the second multi-core connector without intersecting with each other. The optical fibers of the two groups in the at least three groups intersect with each other in a midway point going from the first multi-core connector to the second multi-core connector. The optical fibers of the group other than the two groups extend from the first multi-core connector to the second multi-core connector without intersecting with other optical fibers extending from the first multi-core connector.

A module according to an embodiment includes a first adapter having a first multi-core connector of the optical connector-equipped fiber connection structure connected, a first wall surface exposing and supporting the first adapter, a second adapter having a second multi-core connector of the optical connector-equipped fiber connection structure connected, a second wall surface exposing and supporting the second adapter, and the optical connector-equipped fiber connection structure configured to optically couple the first adapter to the second adapter.

An assembly according to an embodiment includes a plurality of the modules and a polarity C wiring structure configured to optically couple the plurality of modules to each other.

The optical connector-equipped fiber connection structure, the module, and the assembly according to an embodiment have three or more groups including two or more optical fibers adjacent to each other in the first multi-core connector. The two or more optical fibers belonging to the groups in three or more groups extend from the first multi-core connector to the second multi-core connector without intersecting with each other. Accordingly, wiring is provided such that a plurality of optical fibers does not intersect with each other in the groups, and thus an increase in the size of a twist produced on the optical fiber can be suppressed. The optical fibers of two groups in the at least three groups intersect with each other in the midway point going from the first multi-core connector to the second multi-core connector. The optical fibers of the groups other than the two groups do not intersect with the other optical fibers extending from the first multi-core connector in the midway point going from the first multi-core connector to the second multi-core connector. Accordingly, intersections between a plurality of optical fibers can be further decreased, and thus an increase in a twist can be more surely suppressed. As described above, intersections between a plurality of optical fibers is decreased, and thus the configuration of a plurality of optical fibers can be simplified.

In the optical connector-equipped fiber connection structure according to an embodiment, a configuration may be provided in which the at least three groups include a first group, a second group adjacent to the first group, a third group adjacent to the second group, and a fourth group adjacent to the third group, the optical fibers of the first group and the optical fibers of the second group extend from the first multi-core connector to the second multi-core connector without intersecting with the other optical fibers extending from the first multi-core connector, and the optical fibers of the third group and the optical fibers of the fourth group intersect with each other in a midway point going from the first multi-core connector to the second multi-core connector. In this case, wiring can be provided such that a plurality of optical fibers of the first group and a plurality of optical fibers of the second group in the four groups do not intersect with the other optical fibers extending from the first multi-core connector. Accordingly, a twist produced on the optical fibers belonging to the first group and the second group can be further surely suppressed.

In the optical connector-equipped fiber connection structure according to an embodiment, a configuration may be provided in which the at least three groups include a first group, a second group adjacent to the first group, a third group adjacent to the second group, and a fourth group adjacent to the third group, the optical fibers of the first group extend from the first multi-core connector to the second multi-core connector without intersecting with the other optical fibers extending from the first multi-core connector, the optical fibers of the second group intersect with the optical fibers of the third group in a midway point going from the first multi-core connector to the second multi-core connector and intersect with the optical fibers of the fourth group, and the optical fibers of the third group and the optical fibers of the fourth group extend from the first multi-core connector to the second multi-core connector without intersecting with each other. In this case, wiring can be provided such that the optical fibers of the first group, the optical fibers of the third group, and the optical fibers of the fourth group do not intersect with each other. Accordingly, intersections between a plurality of optical fibers can be further decreased, and thus a twist produced on the optical fiber is decreased as well as the configuration can be simplified.

An optical connector-equipped fiber connection structure according to another embodiment includes a first multi-core connector, a second multi-core connector, and a plurality of optical fibers configured to connect the first multi-core connector to the second multi-core connector. The plurality of optical fibers is arrayed in two groups in the second multi-core connector, the plurality of optical fibers has at least four groups including two or more of the optical fibers adjacent to each other in the first multi-core connector, optical fibers of a first group and a fourth group in the first multi-core connector are arrayed at equal positions in groups different from each other in the second multi-core connector, and optical fibers of a second group and a third group in the first multi-core connector are arrayed at equal positions in groups different from each other in the second multi-core connector.

A configuration may be provided in which in the second multi-core connector, the plurality of optical fibers is arrayed along each of two lines, the plurality of optical fibers arrayed on one line of the two lines does not intersect with the other optical fibers extending from the first multi-core connector in a midway point going from the first multi-core connector to the second multi-core connector, and the plurality of optical fibers arrayed on another line of the two lines intersects with the other optical fibers extending from the first multi-core connector in a midway point going from the first multi-core connector to the second multi-core connector. In this case, the plurality of optical fibers arrayed on one line of the two lines of the second multi-core connector does not intersect with the other optical fibers extending from the first multi-core connector. The plurality of optical fibers arrayed on the other line intersect with the other optical fibers extending from the first multi-core connector. Accordingly, the optical fibers on the one line do not intersect with each other, and the optical fibers on the other line intersect with each other, and thus the configuration of the optical fibers of the second multi-core connector can be easily grasped. As a result, the wiring of the optical fibers can be easily performed.

A configuration may be provided in which the first multi-core connector has a plurality of optical fiber retention holes, and the optical fiber extending to the second multi-core connector is inserted into a part of optical fiber retention holes in the plurality of optical fiber retention holes, and the optical fiber extending to the second multi-core connector is not inserted into remaining optical fiber retention holes in the plurality of optical fiber retention holes. In this case, the configuration of the optical fibers in the first multi-core connector can be matched with the configuration of the optical fibers of an optical transceiver to be connected.

A configuration may be provided in which the optical fibers composed of eight optical fibers are connected to the first multi-core connector, and the optical fibers composed of 12×n (n is a natural number) optical fibers are connected to the second multi-core connector. In this case, an eight-core optical connector can be used as the first multi-core connector as well as a 12-by-n-core optical connector can be used as the second multi-core connector.

The second multi-core connector may be a 24-core MPO connector. In this case, a 24-core MPO connector can be used as the second multi-core connector.

The second multi-core connector may include two 12-core MPO connectors. In this case, two 12-core MPO connectors can be used as the second multi-core connector.

DETAIL OF EMBODIMENTS

Specific examples of an optical connector-equipped fiber connection structure, a module, and an assembly according to embodiments of the present disclosure will be described with reference to the drawings. The present disclosure is not limited to specific examples below, and the present disclosure intends to include all modifications described in claims and in the scope equivalent to the scope of claims. In the description of the drawings, the same components or corresponding components are designated with the same reference signs, and the duplicate description is appropriately omitted. For easy understanding, the drawings are sometimes simplified or exaggerated, and dimensions, ratios, and any other parameters are not limited to those on the drawings.

First Embodiment

Figure 2:
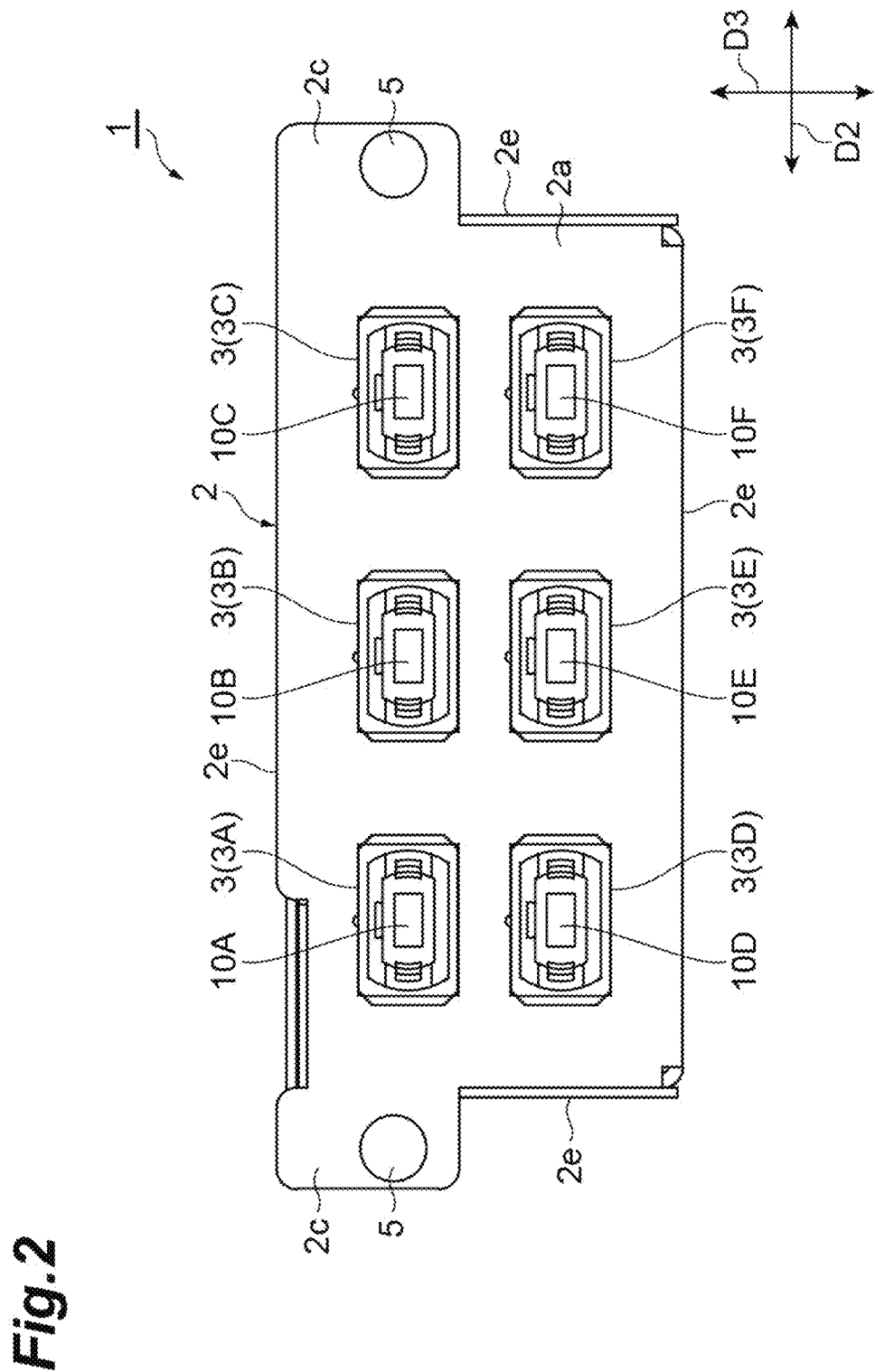
FIG. 2 is a side view of the module in FIG. 1.
Figure 3:
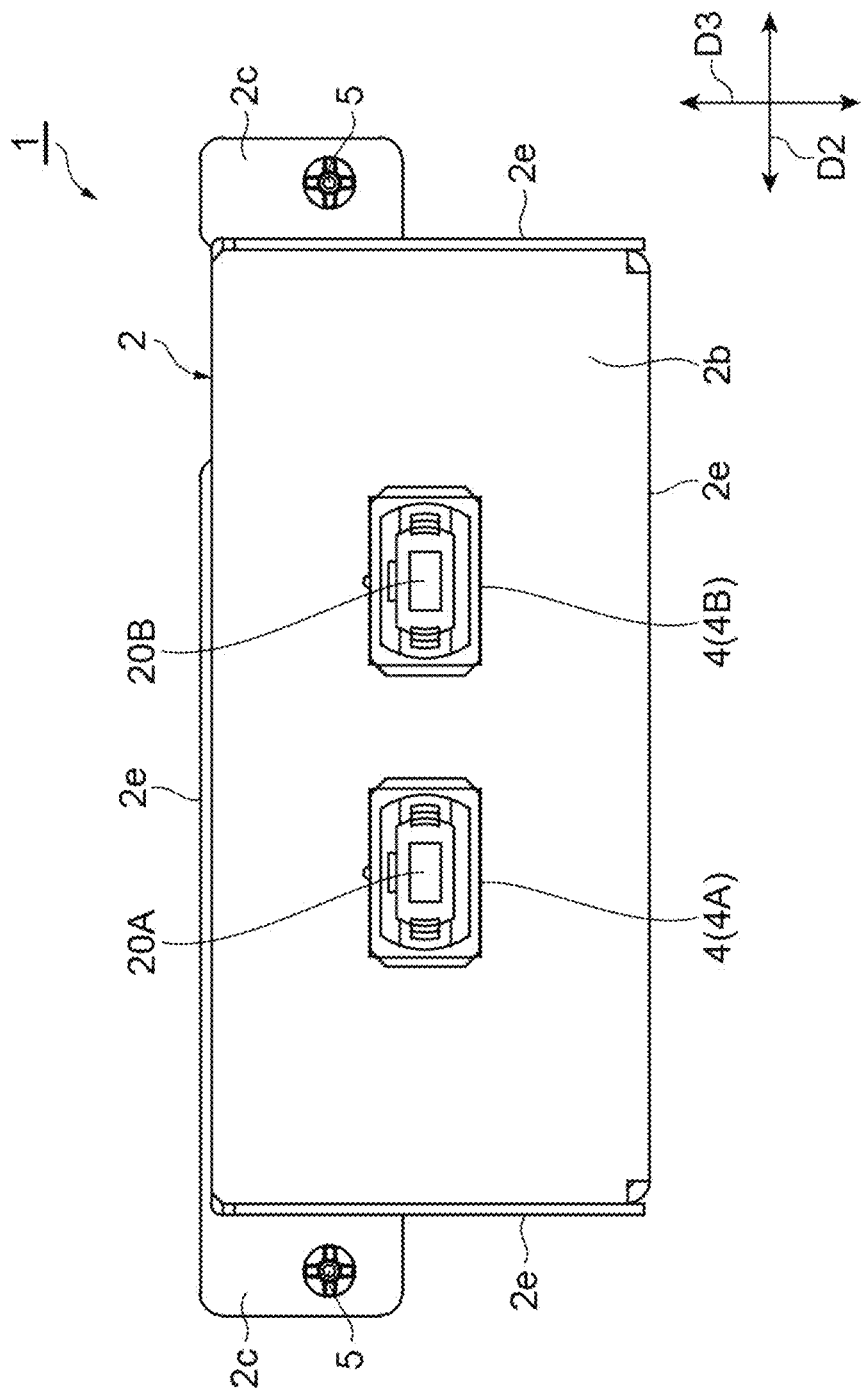
FIG. 3 is a side view of the module in FIG. 1 on the opposite side of the side view in FIG. 2.

FIG. 1 is a plan view showing an exemplary module 1 according to a first embodiment. FIG. 2 is a side view of the module 1. FIG. 3 is a side view of the module 1 on the opposite side of the side view in FIG. 2. As shown in FIGS. 1 to 3, as an example, the module 1 is a device that is a cassette type device mounted on the rack of a data center, and constitutes the optical wiring stand of the rack. The module 1 includes a casing 2 formed in a rectangular box shape extending in a first direction D1 that is the longitudinal direction, D2 that is a width direction, and a third direction D3 that is a height direction.

The casing 2 has a first wall surface 2a directed to one side in the first direction D1, a second wall surface 2b directed to the other side in the first direction D1, and four third wall surfaces 2e joining the first wall surface 2a to the second wall surface 2b. On the first wall surface 2a, a first adapter 3 is supported and exposed. On the second wall surface 2b, a second adapter 4 is supported and exposed. For example, the module 1 includes a plurality of first adapters 3 and a plurality of second adapters 4. However, at least any of the number of the first adapters 3 and the number of the second adapters 4 may be singular, and these numbers are appropriately changeable.

For example, the module 1 includes a nylon latch 5 that is mounted on each of a plurality of chassis detachably attached to the rack and that is fit into the chassis. The module 1 may be mounted on the rack via something other than the chassis (for example, MPO cassette base). The first wall surface 2a has a pair of the projections 2c projecting to both end sides in the second direction D2, and the nylon latches 5 individually penetrate the pair of projections 2c in the first direction D1.

As an example, the module 1 includes six first adapters 3 and two second adapters 4. In the following, in order to distinguish between these six first adapters 3, these six first adapters 3 are sometimes referred to as a first adapter 3A, a first adapter 3B, a first adapter 3C, a first adapter 3D, a first adapter 3E, and a first adapter 3F. In order to distinguish between these two second adapters 4, these two second adapters 4 are sometimes referred to as a second adapter 4A and a second adapter 4B.

For example, the first adapter 3A, the first adapter 3B, the first adapter 3C, the first adapter 3D, the first adapter 3E, and the first adapter 3F are placed in a grid shape on the first wall surface 2a. On the first wall surface 2a, the first adapter 3A shows the left most and upper most first adapter 3, the first adapter 3B shows the second left and upper most first adapter 3, the first adapter 3C shows the third left and upper most first adapter 3, the first adapter 3D shows the left most and second upper first adapter 3, the first adapter 3E shows the second left and second upper first adapter 3, and the first adapter 3F shows the third left and second upper first adapter 3.

For example, the second adapter 4A and the second adapter 4B are placed along the second direction D2 on the second wall surface 2b. On the second wall surface 2b, the second adapter 4A shows the second adapter 4 on the left side, and the second adapter 4B shows that on the right side. However, the placement of these first adapters 3A to 3F and the second adapters 4A and 4B is appropriately changeable.

To the inside of the first adapters 3A to 3F, first multi-core connectors 10A to 10F are individually connected, and to the inside of the second adapters 4A and 4B, second multi-core connectors 20A and 20B are connected. For example, the first multi-core connectors 10A to 10F are eight-core MPO connectors (including eight optical fibers), and an optical transceiver is connected to each of the first multi-core connectors 10A to 10F.

The second multi-core connectors 20A and 20B are 24-core MPO connectors, for example, (including 24 optical fibers). The first multi-core connectors 10A to 10F may be the same multi-core connectors, or may be multi-core connectors different from each other. The second multi-core connectors 20A and 20B may be the same multi-core connectors, or may be multi-core connectors different from each other.

Figure 4:
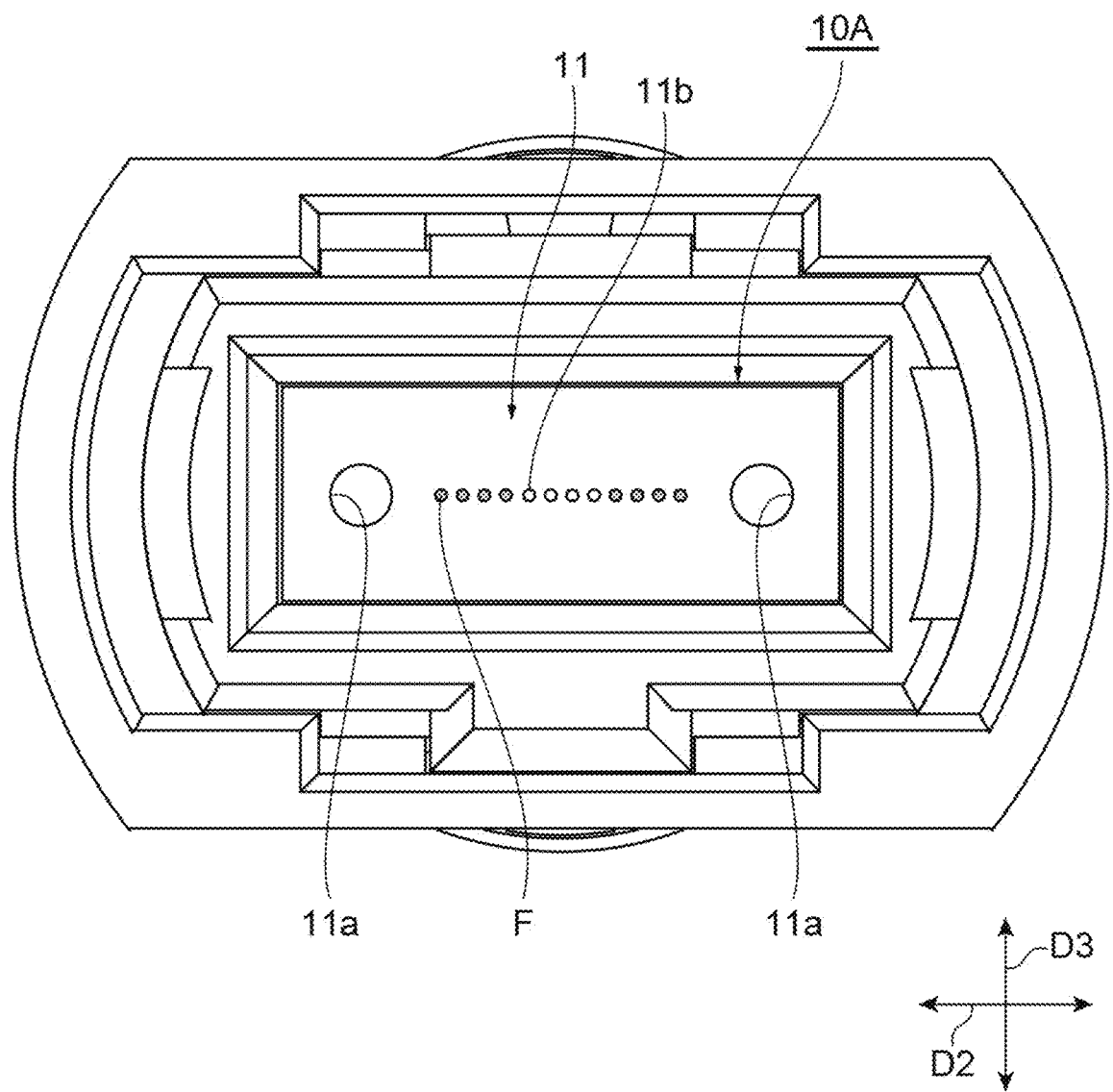
FIG. 4 is a front view showing one multi-core connector of the optical connector-equipped fiber connection structure of the module in FIG. 1.

FIG. 4 is a front view showing the first multi-core connector 10A. As described above, the configurations of the first multi-core connectors 10B to 10F can be made the same as the configuration of the first multi-core connector 10A, and in the following, the detailed description of the first multi-core connectors 10B to 10F is omitted. As shown in FIG. 4, the first multi-core connector 10A includes, for example, a ferrule 11 having a plurality of guide holes 11a and a plurality of optical fiber retention holes 11b and a plurality of optical fibers F individually inserted into parts of the plurality of optical fiber retention holes 11b.

As an example, on the end face of the ferrule 11, a pair of guide holes 11a is formed. Between the pair of guide holes 11a, the plurality of optical fiber retention holes 11b is formed along the second direction D2. The number of the optical fiber retention holes 11b is 12, for example, and an MPO connector standardized as a 12-core MPO connector is preferably used. In the plurality of optical fiber retention holes 11b, the optical fibers F are inserted into a part of the optical fiber retention holes 11b, and the optical fibers F inserted into the optical fiber retention holes 11b extend to the second multi-core connector 20A. For example, no optical fiber F is inserted into the remaining optical fiber retention holes 11b.

For example, in the plurality of optical fiber retention holes 11b, the optical fibers F are inserted into the plurality of optical fiber retention holes 11b located on both end sides in the second direction D2, and the optical fibers F inserted into the optical fiber retention hole 11b extend to the second multi-core connector 20A. For example, no optical fiber F is inserted into the plurality of optical fiber retention holes 11b located on the center side in the second direction D2. In the present embodiment, the optical fibers F are inserted into eight optical fiber retention holes 11b located on both end sides in the second direction D2, and these optical fibers F extend to the second multi-core connector 20A. No optical fiber F extending to the second multi-core connector 20A is inserted into four optical fiber retention holes 11b located on the center side in the second direction D2.

Into the remaining optical fiber retention holes 11b (the optical fiber retention holes 11b into which no optical fiber F extending to the second multi-core connector 20A is inserted), a dummy material that buries the holes may be inserted. As examples of the dummy material, glass fibers, glass rods, ceramics materials, or any other materials having the outer diameter equivalent to the outer diameter of the optical fiber F are used. These dummy materials preferably have lengths to the extent that the lengths are fit into the inside of the ferrule 11. In the ferrule 11 that is a 12-core MPO ferrule, ferrules having no optical fiber retention hole 11b formed only at the parts corresponding to the holes that are to be buried with the dummy material are also usable.

Figure 5:
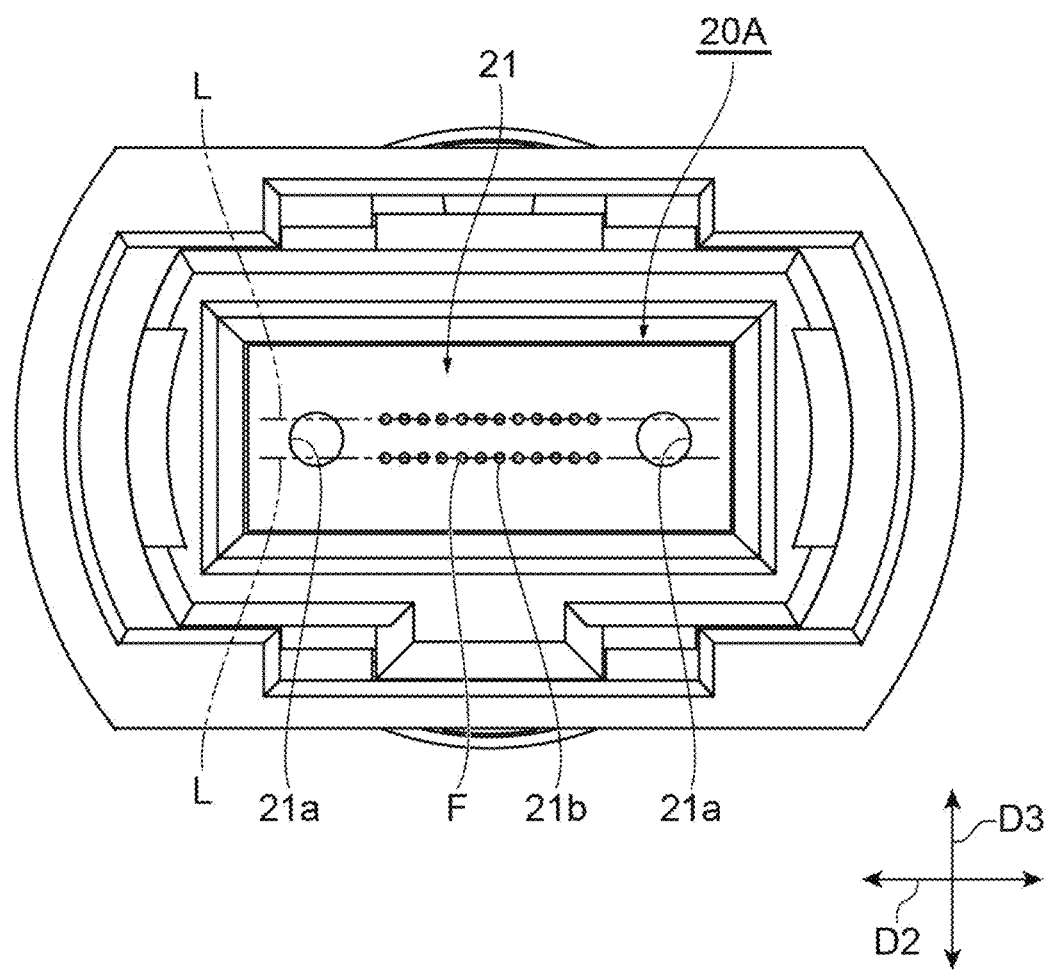
FIG. 5 is a front view showing the other multi-core connector of the optical connector-equipped fiber connection structure of the module in FIG. 1.

FIG. 5 is a front view showing the second multi-core connector 20A. As described above, the configuration of the second multi-core connector 20B can be made the same as the configuration of the second multi-core connector 20A, and in the following, the detailed description of the second multi-core connector 20B is appropriately omitted. As shown in FIG. 5, the second multi-core connector 20A includes, for example, a ferrule 21 having a plurality of guide holes 21a and plurality of optical fiber retention holes 21b, and a plurality of optical fibers F individually inserted into the plurality of optical fiber retention holes 21b.

For example, similarly to the guide hole 11a described above, a pair of guide holes 21a is formed on the end face of the ferrule 21. Between the pair of guide holes 21a, the plurality of optical fiber retention holes 21b is formed along each of two lines L extending in the second direction D2. The number of the optical fiber retention holes 21b is 24, for example, and 12 optical fiber retention holes 21b are placed on each of the lines L along the second direction D2.

Figure 6:
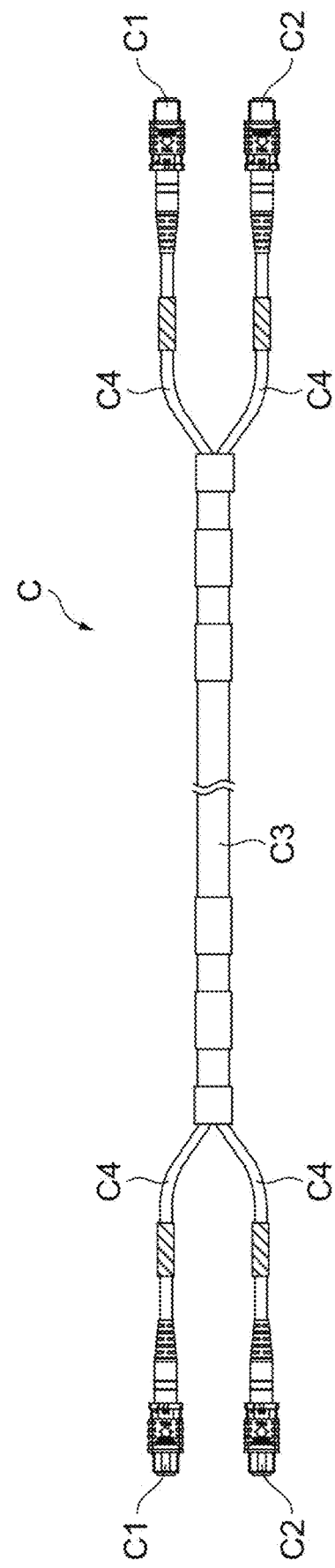
FIG. 6 is a diagram showing an example of optical cable including the polarity C wiring structure of an assembly according to the first embodiment.

FIG. 6 is a diagram showing an exemplary MPO cable C to be connected to the second multi-core connector 20A, and the MPO cable C is a 24-core round cord or a unit that is a bundle of 24-core round cords, for example. As shown in FIG. 6, the MPO cable C includes multi-core connectors C1 and C2 at both ends, and the multi-core connectors C1 and C2 are respectively connected to the second multi-core connectors 20A and 20B. For example, the MPO cable C includes a trunk cable C3 and round cords C4, two round cords C4 extending from each of both ends of the trunk cable C3. One of the two round cords C4 extending from the trunk cable C3 is provided with the multi-core connector C1, and the other of the two round cords C4 is provided with the multi-core connector C2.

Figure 7:
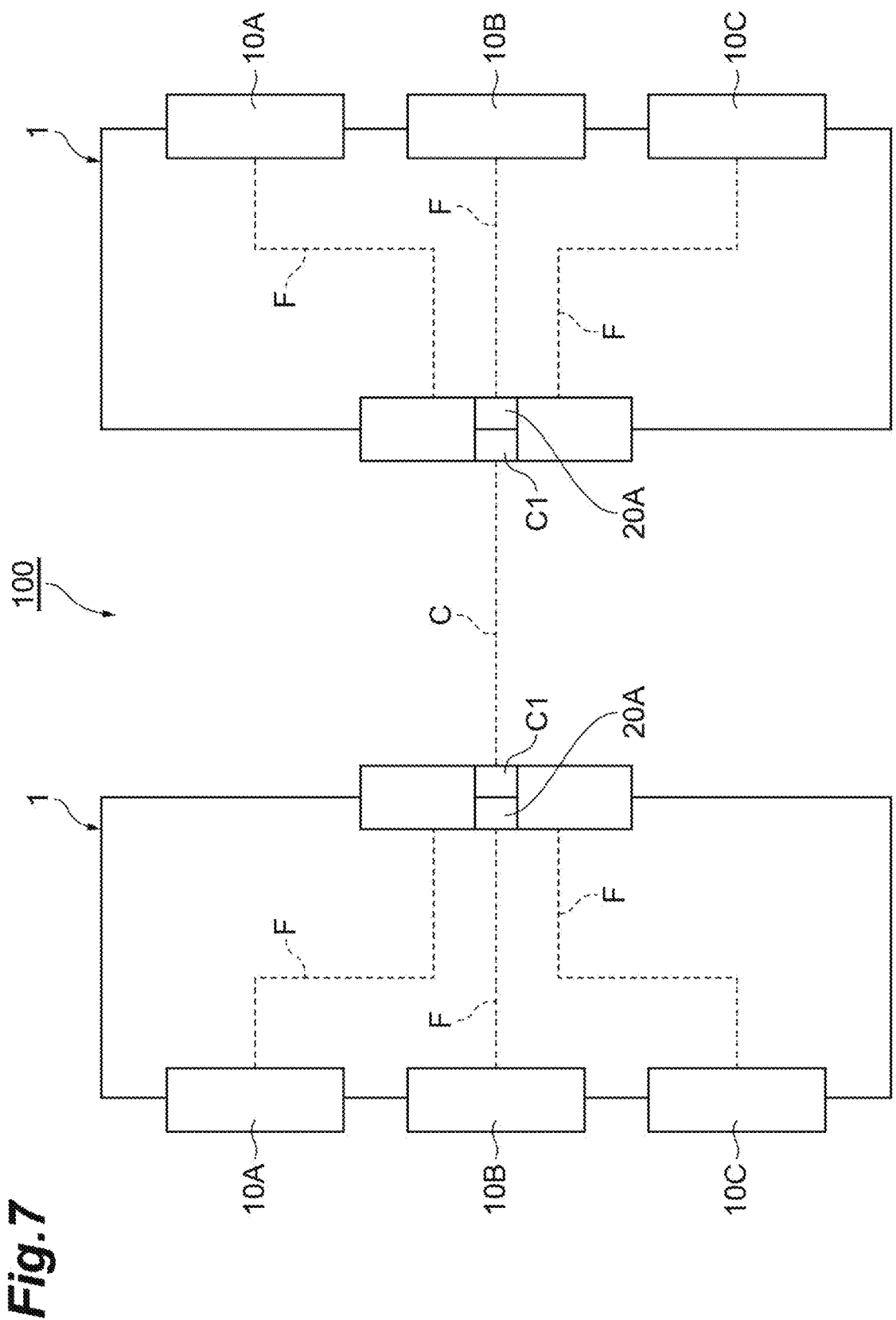
FIG. 7 is a diagram schematically showing the assembly according to the first embodiment.

FIG. 7 is a diagram schematically showing the configuration of an assembly 100 including the above-described MPO cable C. FIG. 7 shows the configuration of the assembly 100 involved in the connection of the multi-core connector C1 of the MPO cable C. The assembly 100 includes a plurality of modules 1 and the MPO cable C that optically couples the plurality of modules 1 to each other. The multi-core connectors C1 of the MPO cable C are individually connected to the second multi-core connectors 20A of the modules 1. The second multi-core connector 20A is connected to the first multi-core connectors 10A to 10C of the modules 1 through the plurality of optical fibers F. In the present embodiment, the optical fiber F in the inside of the module 1 is provided as a single cable that is not in a collective form like a ribbon fiber, for example. Note that the plurality of optical fibers F may be collected, or a part of a ribbon fiber, for example, may be separated into a single-core optical fiber. The plurality of optical fibers F may be ones that at least a part of a single-core optical fiber is collected.

Figure 8:
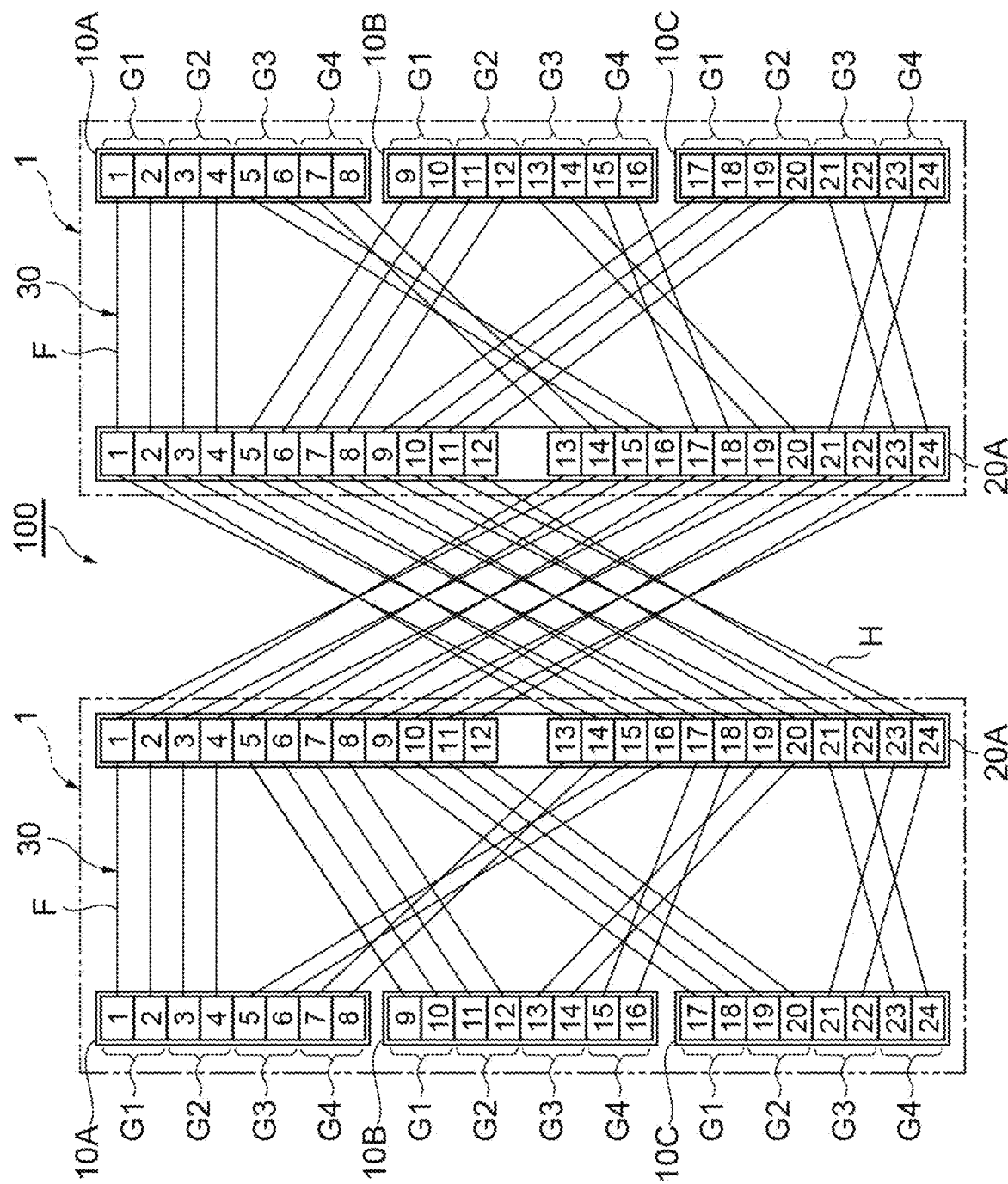
FIG. 8 is a diagram schematically showing the wiring structure of the optical fibers of the assembly in FIG. 7.

FIG. 8 is a diagram showing the wiring structure of the assembly 100. As shown in FIG. 8, in the modules 1, eight optical fibers F are connected to each of the first multi-core connectors 10A to 10C, and 24 optical fibers F are connected to the second multi-core connector 20A. Between a pair of the second multi-core connectors 20A (the multi-core connectors C1), 24 optical fibers H extend.

In the following, the connecting parts of the optical fibers F in the first multi-core connector 10A are ports 1 to 8, the connecting parts of the optical fibers F of the first multi-core connector 10B are ports 9 to 16, and the connecting parts of the optical fibers F of the first multi-core connector 10C are ports 17 to 24. The connecting parts of the optical fibers F of the second multi-core connector 20A on one side of the lines L are ports 1 to 12, and the connecting parts of the optical fibers F on the other side of the lines L are ports 13 to 24. Note that numerical characters in rectangles in FIG. 8 and FIG. 9, described later, show the port numbers described above. The optical fibers F are arranged in the order of the above-described port numbers of the first multi-core connectors 10A, 10B, and 10C and the second multi-core connector 20A.

Between the plurality of modules 1, a polarity C wiring structure that optically couples the plurality of modules 1 to each other is provided. Here, the polarity C wiring structure is polarity C structures defined according to TIA-568.3 and other standards prescribed by the American National Standards Institute. In the following, an example using the 24-core MPO connector will be described. In the present embodiment, as the polarity C wiring structure, a structure is shown in which optical fibers H extending from an odd number port and an even number port adjacent to each other change places at ports of the counterpart optical connector. As a specific example, in the polarity C wiring structure of the present embodiment, optical fibers H extending from port 1 to port 24 of one of the second multi-core connectors 20A are connected to port 14, port 13, port 16, port 15, port 18, port 17, port 20, port 19, port 22, port 21, port 24, port 23, port 2, port 1, port 4, port 3, port 6, port 5, port 8, port 7, port 10, port 9, port 12, and port 11 of the other of the second multi-core connectors 20A.

The first multi-core connector 10A includes a first group G1 including port 1 and port 2, a second group G2 including port 3 and port 4, a third group G3 including port 5 and port 6, and a fourth group G4 including port 7 and port 8. The first multi-core connector 10B includes a first group G1 including port 9 and port 10, a second group G2 including port 11 and port 12, a third group G3 including port 13 and port 14, and a fourth group G4 including port 15 and port 16. The first multi-core connector 10C includes a first group G1 including port 17 and port 18, a second group G2 including port 19 and port 20, a third group G3 including port 21 and port 22, and a fourth group G4 including port 23 and port 24.

In the following, the detail of an optical connector-equipped fiber connection structure 30 according to the present embodiment will be described. For example, the optical connector-equipped fiber connection structure 30 includes any of the first multi-core connectors 10A to 10C and includes the second multi-core connector 20A. The optical fibers F of the first group G1 and the second group G2 of the first multi-core connector 10A extend from port 1 to port 4 of the first multi-core connector 10A to port 1 to port 4 of the second multi-core connector 20A, respectively.

The optical fibers F of the third group G3 of the first multi-core connector 10A extend from port 5 and port 6 of the first multi-core connector 10A to port 15 and port 16 of the second multi-core connector 20A, respectively. The optical fibers F of the fourth group G4 of the first multi-core connector 10A extend from port 7 and port 8 of the first multi-core connector 10A to port 13 and port 14 of the second multi-core connector 20A, respectively. The optical fibers F extending from the third group G3 of the first multi-core connector 10A intersect with the optical fibers F extending from the fourth group G4 of the first multi-core connector 10A before reaching the second multi-core connector 20A.

The optical fibers F of the first group G1 and the second group G2 of the first multi-core connector 10B extend from port 9 to 12 of the first multi-core connector 10B to port 5 to port 8 of the second multi-core connector 20A, respectively. The optical fibers F of the third group G3 of the first multi-core connector 10B extend from port 13 and port 14 of the first multi-core connector 10B to port 19 and port 20 of the second multi-core connector 20A, respectively.

The optical fibers F of the fourth group G4 of the first multi-core connector 10B extend from port 15 and port 16 of the first multi-core connector 10B to port 17 and port 18 of the second multi-core connector 20A, respectively. The optical fibers F extending from the third group G3 of the first multi-core connector 10B intersect with the optical fibers F extending from the fourth group G4 of the first multi-core connector 10B before reaching the second multi-core connector 20A.

The optical fibers F of the first group G1 and the second group G2 of the first multi-core connector 10C extend from port 17 to port 20 of the first multi-core connector 10C to port 9 to 12 of the second multi-core connector 20A, respectively. The optical fibers F of the third group G3 of the first multi-core connector 10C extend from port 21 and port 22 of the first multi-core connector 10C to port 23 and port 24 of the second multi-core connector 20A, respectively.

The optical fibers F of the fourth group G4 of the first multi-core connector 10C extend from port 23 and port 24 of the first multi-core connector 10C to port 21 and port 22 of the second multi-core connector 20A, respectively. The optical fibers F extending from the third group G3 of the first multi-core connector 10C intersect with the optical fibers F extending from the fourth group G4 of the first multi-core connector 10C before reaching the second multi-core connector 20A.

The detail of the optical connector-equipped fiber connection structure 30 has been described above. However, the configuration of the optical fiber F of the optical connector-equipped fiber connection structure 30 is not limited to the above description, and is appropriately changeable. For example, the groups are not limited to four groups including the first group G1, the second group G2, the third group G3, and the fourth group G4, and the number of groups may be at least three groups or more. The number of the optical fibers F belonging to the groups is not limited to two, and the number may be three or more. In the following, the configuration, operation, and effect of the optical connector-equipped fiber connection structure 30 will be described.

In the optical connector-equipped fiber connection structure 30, the plurality of optical fibers F includes at least three groups including two or more optical fibers F adjacent to each other in the first multi-core connector 10A. In the groups, the two or more optical fibers F extend from the first multi-core connector 10A to the second multi-core connector 20A without intersecting with each other.

The optical fibers F of two groups of the at least three groups (e.g. the third group G3 and the fourth group G4) intersect with each other in the midway point going from the first multi-core connector 10A to the second multi-core connector 20A. The optical fibers F of the groups (e.g. the first group G1 and the second group G2) other than these two groups extend from the first multi-core connector 10A to the second multi-core connector 20A without intersecting with the other optical fibers F extending from the first multi-core connector 10A.

As described above, the optical connector-equipped fiber connection structure 30, the module 1, and the assembly 100 according to the present embodiment have three or more groups including two or more optical fibers F adjacent to each other in the first multi-core connector 10A. In these three or more groups, the two or more optical fibers F belonging to the groups extend from the first multi-core connector 10A to the second multi-core connector 20A without intersecting with each other. Accordingly, wiring can be provided such that the plurality of optical fibers F does not intersect with each other in the groups, and thus an increase in the size of a twist produced on the optical fiber F can be suppressed.

The optical fibers F of the two groups in the at least three groups intersect with each other in the midway point going from the first multi-core connector 10A to the second multi-core connector 20A, and the optical fibers F of the groups other than these two groups do not intersect with the other optical fibers F extending from the first multi-core connector 10A in the midway point going from the first multi-core connector 10A to the second multi-core connector 20A. Accordingly, intersections between the plurality of optical fibers F can be further decreased, and thus an increase in a twist can be more surely suppressed. As described above, intersections between the plurality of optical fibers F are decreased, and thus the configuration of the plurality of optical fibers F can be simplified.

In the optical connector-equipped fiber connection structure 30, at least three groups include the first group G1, the second group G2 adjacent to the first group G1, the third group G3 adjacent to the second group G2, and the fourth group G4 adjacent to the third group G3. The optical fibers F of the first group G1 and the optical fibers F of the second group G2 extend from the first multi-core connector 10A to the second multi-core connector 20A without intersecting with the other optical fibers F extending from the first multi-core connector 10A.

The optical fibers F of the third group G3 and the optical fibers F of the fourth group G4 intersect with each other in the midway point going from the first multi-core connector 10A to the second multi-core connector 20A. Therefore, in the four groups, wiring can be provided such that the plurality of optical fibers F of the first group G1 and the plurality of optical fibers F of the second group G2 do not intersect with the other optical fibers F extending from the first multi-core connector 10A. Accordingly, twists produced on the optical fibers F belonging to the first group G1 and the second group G2 can be further surely suppressed.

In the second multi-core connector 20A, the plurality of optical fibers F is arrayed along each of the two lines L. The plurality of optical fibers F arrayed on one line of the two lines L (e.g. port 1 to port 12 of the second multi-core connector 20A) does not intersect with the other optical fibers F extending from the first multi-core connector 10A in the midway point going from the first multi-core connector 10A to the second multi-core connector 20A. The plurality of optical fibers F arrayed on the other line (e.g. port 13 to port 24 of the second multi-core connector 20A) intersects with the other optical fibers F extending from the first multi-core connector 10A in the midway point going from the first multi-core connector 10A to the second multi-core connector 20A.

In this case, the plurality of optical fibers F arrayed on one of the two lines L of the second multi-core connector 20A (e.g. port 1 to port 12) does not intersect with the other optical fibers F extending from the first multi-core connector 10A. The plurality of optical fibers F arrayed on the other line (e.g. port 13 to port 24) intersects with the other optical fibers F extending from the first multi-core connector 10A. Accordingly, the optical fibers F on the one line L do not intersect with each other, and the optical fibers F on the other line L intersect with each other, and thus the configuration of the optical fiber F of the second multi-core connector 20A can be easily grasped. As a result, the wiring of the optical fiber F can be easily performed. The operation and the effect described above can be similarly obtained from the relationship between the first multi-core connector 10B and the second multi-core connector 20A and the relationship between the first multi-core connector 10C and the second multi-core connector 20A, and thus a further noticeable effect is exerted.

In the example above, the relationship between the pluralities of optical fibers F arrayed on one of the two lines L of the second multi-core connector 20A (e.g. port 1 to port 12) and the plurality of optical fibers F arrayed on the other line L (e.g. port 13 to port 24) is described. However, in the case of the second multi-core connector 20A that is two 12-core connectors, i.e., in the case of one second multi-core connector 20A having the optical fiber retention holes 11b corresponding to port 1 to port 12 and another second multi-core connector 20A having the optical fiber retention holes 11b corresponding to port 13 to port 24, similar effect as described above can be obtained.

In the optical connector-equipped fiber connection structure 30, the optical fibers F of the first group G1 extend from port 1 and port 2 of the first multi-core connector 10A to port 1 and port 2 of the second multi-core connector 20A, respectively. The optical fibers F of the fourth group G4 of the first multi-core connector 10A extend from port 7 and port 8 to port 13 and port 14 of the second multi-core connector 20A, respectively. The optical fibers F of the second group G2 of the first multi-core connector 10A extend from port 3 and port 4 to port 3 and port 4 of the second multi-core connector 20A, respectively. The optical fibers F of the third group G3 of the first multi-core connector 10A extend from port 5 and port 6 to port 15 and port 16 of the second multi-core connector 20A, respectively.

Here, when port 1 to port 12 of the second multi-core connector 20A make one group and port 13 to port 24 of the second multi-core connector 20A make the other group, the relationships between port 1 and port 13, between port 2 and port 14, between port 3 and port 15, between port 4 and port 16, between port 5 and port 17, between port 6 and port 18, between port 7 and port 19, between port 8 and port 20, between port 9 and port 21, between port 10 and port 22, between port 11 and port 23, and between port 12 and port 24 are groups different from each other and correspond to the same positions in the second multi-core connector 20A. That is, in the second multi-core connector 20A, port 1 and port 13, port 2 and port 14, . . . , and port 12 and port 24 are placed at the same positions of the groups different from each other.

The optical fibers F of the first group G1 and the fourth group G4 of the first multi-core connector 10A are arrayed at the same positions in the groups different from each other (port 1 and port 2, and port 13 and port 14) in the second multi-core connector 20A. The optical fibers F of the second group G2 and the third group G3 of the first multi-core connector 10A are arrayed at the same positions in the groups different from each other (port 3 and port 4, and port 15 and port 16) in the second multi-core connector 20A. The same things are also applied to the relationship between the first multi-core connector 10B and the second multi-core connector 20A and the relationship between the first multi-core connector 10C and the second multi-core connector 20A. Two modules 1 having the identical structure are used as well as a polarity C wiring structure (such as a cable) that is a standard as an optical coupling medium is used, and thus interactive optical transmission and reception lines can be formed while the same optical wiring forms are provided on the modules 1 side with no use of special components.

As shown in FIG. 4, the first multi-core connectors 10A to 10C each have the plurality of optical fiber retention holes 11b. The optical fiber F is inserted into a part of the optical fiber retention holes 11b in the plurality of optical fiber retention holes 11b, and the optical fibers F contributing to optical communication do not necessarily have to be inserted into the remaining optical fiber retention holes 11b in the plurality of optical fiber retention holes 11b. In this case, the configurations of the optical fibers F of the first multi-core connectors 10A to 10C can be matched with the configurations of the optical fibers of an optical transceiver to be connected.

In the optical connector-equipped fiber connection structure 30, eight optical fibers F may be connected to each of the first multi-core connectors 10A, 10B, and 10C, and 12×n (n is a natural number) optical fibers F may be connected to the second multi-core connector 20A. In this case, an eight-core optical connector can be used as the first multi-core connectors 10A to 10C as well as a 12-by-n-core optical connector can be used as the second multi-core connector 20A.

In the optical connector-equipped fiber connection structure 30, the second multi-core connector 20A may be a 24-core MPO connector. In this case, a 24-core MPO connector can be used as the second multi-core connector 20A. On the other hand, instead of the 24-core MPO connector, the second multi-core connector may include two 12-core MPO connectors. As described above, the number of the second multi-core connectors and the number of cores of the second multi-core connector are appropriately changeable. Similarly, the number of the first multi-core connectors and the number of cores of the first multi-core connector, and the number of the optical fibers are also appropriately changeable.

Second Embodiment

Figure 9:
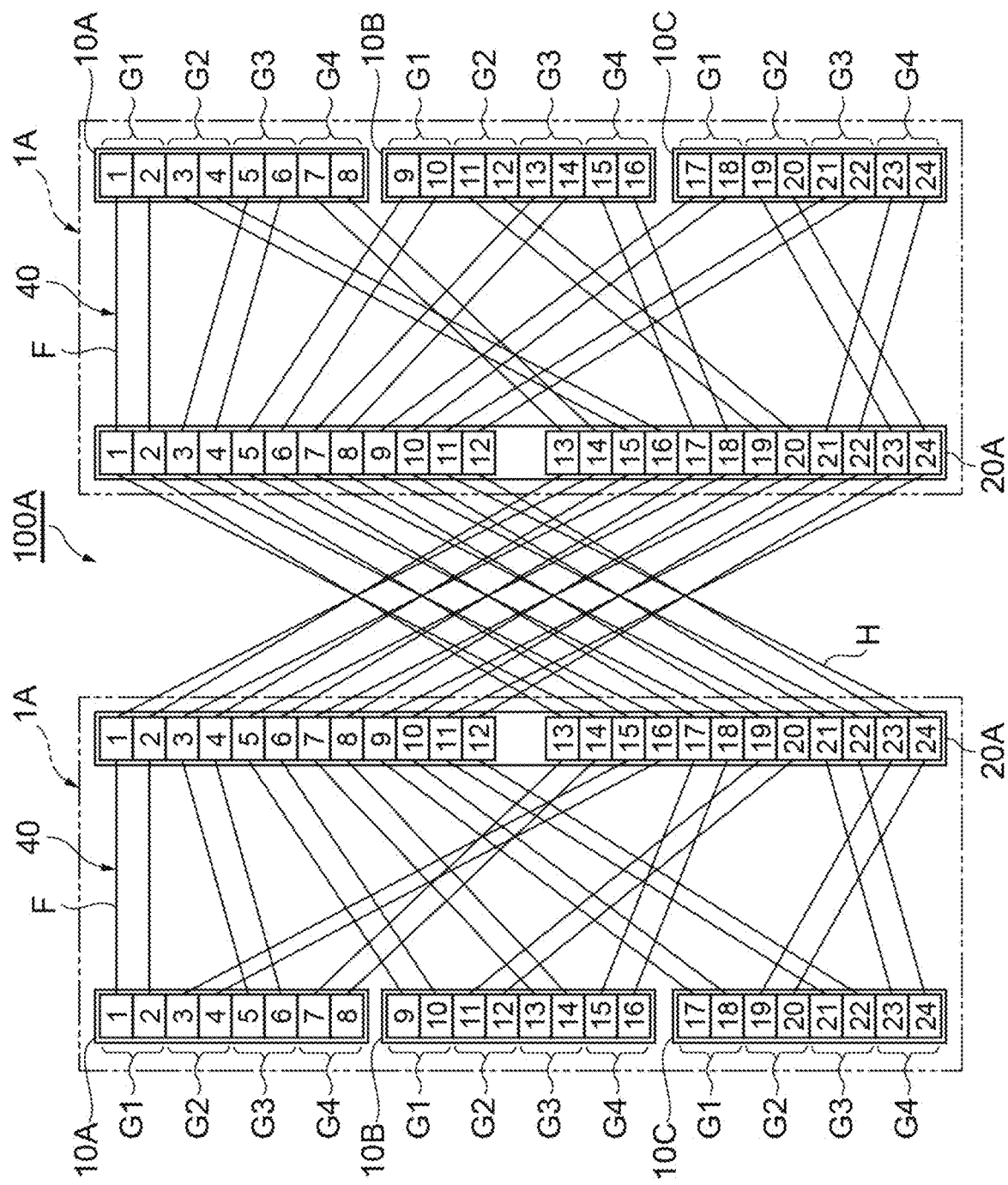
FIG. 9 is a diagram schematically showing the wiring structure of the optical fibers of an assembly according to a second embodiment.

Next, an optical connector-equipped fiber connection structure 40, a module 1A, and an assembly 100A according to a second embodiment will be described with reference to FIG. 9. As shown in FIG. 9, in the second embodiment, the configuration of an optical fiber F in the inside of the module 1A is different from that of the first embodiment. In the following, the duplicate description with the first embodiment is appropriately omitted.

In the optical connector-equipped fiber connection structure 40, optical fibers F of a first group G1 of a first multi-core connector 10A extend from port 1 and port 2 of the first multi-core connector 10A to port 1 and port 2 of a second multi-core connector 20A, respectively. Optical fibers F of a second group G2 of the first multi-core connector 10A extend from port 3 and port 4 of the first multi-core connector 10A to port 15 and port 16 of the second multi-core connector 20A, respectively.

The optical fibers F of the second group G2 of the first multi-core connector 10A intersect with optical fibers F extending from the third group G3 of the first multi-core connector 10A, then intersect with optical fibers F extending from a fourth group G4 of the first multi-core connector 10A, and reach the second multi-core connector 20A. The optical fiber F of the third group G3 of the first multi-core connector 10A extends from the port 5 and port 6 of the first multi-core connector 10A to the port 3 and port 4 of the second multi-core connector 20A, respectively. The optical fibers F of the fourth group G4 of the first multi-core connector 10A extend from port 7 and port 8 of the first multi-core connector 10A to port 13 and port 14 of the second multi-core connector 20A, respectively.

Optical fibers F of a first group G1 of a first multi-core connector 10B extend from port 9 and port 10 of the first multi-core connector 10A to port 5 and port 6 of the second multi-core connector 20A, respectively. Optical fibers F of a second group G2 of the first multi-core connector 10B extend from port 11 and port 12 of the first multi-core connector 10B to port 19 and port 20 of the second multi-core connector 20A, respectively.

Optical fibers F of a third group G3 of the first multi-core connector 10B extend from port 13 and port 14 of the first multi-core connector 10A to port 7 and port 8 of the second multi-core connector 20A, respectively. Optical fibers F of a fourth group G4 of the first multi-core connector 10B extend from port 15 and port 16 of the first multi-core connector 10A to port 17 and port 18 of the second multi-core connector 20A, respectively.

Optical fibers F of a first group G1 of a first multi-core connector 10C extend from port 17 and port 18 of the first multi-core connector 10B to port 9 and port 10 of the second multi-core connector 20A, respectively. Optical fibers F of a second group G2 of the first multi-core connector 10C extend from port 19 and port 20 of the first multi-core connector 10C to port 23 and port 24 of the second multi-core connector 20A, respectively.

Optical fibers F of a third group G3 of the first multi-core connector 10C extend from port 21 and port 22 of the first multi-core connector 10C to port 11 and port 12 of the second multi-core connector 20A, respectively. Optical fibers F of a fourth group G4 of the first multi-core connector 10C extend from port 23 and port 24 of the first multi-core connector 10A to port 21 and port 22 of the second multi-core connector 20A, respectively.

As described above, in the optical connector-equipped fiber connection structure 40, the module 1A, and the assembly 100A according to the second embodiment, two or more optical fibers F belonging to each group extend from the first multi-core connector 10A to the second multi-core connector 20A without intersecting with each other. Accordingly, wiring can be provided such that the plurality of optical fibers F do not intersect with each other in the groups, and thus an increase in the size of a twist produced on the optical fiber F can be suppressed, and the effect similar to the first embodiment can be obtained.

In the optical connector-equipped fiber connection structure 40, at least three groups include the first group G1, the second group G2 adjacent to the first group G1, the third group G3 adjacent to the second group G2, and the fourth group G4 adjacent to the third group G3. The optical fibers F of the first group G1 extend from the first multi-core connector 10A to the second multi-core connector 20A without intersecting with the other optical fibers F extending from the first multi-core connector 10A.

The optical fiber F of the second group G2 intersects the optical fiber F of the third group G3 and intersects the optical fiber F of the fourth group G4 in a midway point going from the first multi-core connector 10A to the second multi-core connector 20A. The optical fibers F of the third group G3 and the optical fibers F of the fourth group G4 extend from the first multi-core connector 10A to the second multi-core connector 20A without intersecting with each other.

Consequently, wiring can be provided such that the optical fibers F of the first group G1, the optical fibers F of the third group G3, and the optical fibers F of the fourth group G4 do not intersect with each other. Accordingly, intersections between the plurality of optical fibers F can be further decreased, and thus a twist produced on the optical fiber F is decreased, and the configuration can be simplified.

The optical fibers F of the first group G1 of the first multi-core connector 10A extend from port 1 and port 2 to port 1 and port 2 of the second multi-core connector 20A, respectively. The optical fibers F of the fourth group G4 of the first multi-core connector 10A extend from port 7 and port 8 to port 13 and port 14 of the second multi-core connector 20A, respectively. The optical fibers F of the second group G2 of the first multi-core connector 10A extend from port 3 and port 4 to port 15 and port 16 of the second multi-core connector 20A, respectively. The optical fibers F of the third group G3 of the first multi-core connector 10A extend from port 5 and port 6 to port 3 and port 4 of the second multi-core connector 20A, respectively.

Similarly to the foregoing first embodiment, when port 1 to port 12 of the second multi-core connector 20A make one group and port 13 to port 24 of the second multi-core connector 20A make the other group, the relationships between port 1 and port 13, port 2 and port 14, . . . , and port 12 and port 24 are groups different from each other and correspond to the same positions in the second multi-core connector 20A. That is, in the second multi-core connector 20A, port 1 and port 13, port 2 and port 14, . . . , and port 12 and port 24 are placed at the same positions in the groups different from each other.

The optical fibers F of the first group G1 and the fourth group G4 of the first multi-core connector 10A are arrayed at the same positions in the groups different from each other (port 1 and port 2, and port 13 and port 14) in the second multi-core connector 20A. The optical fibers F of the second group G2 and the third group G3 of the first multi-core connector 10A are arrayed at the same positions (port 15 and port 16, and port 3 and port 4) in the groups different from each other in the second multi-core connector 20A. The same things are also applied to the relationship between the first multi-core connector 10B and the second multi-core connector 20A and the relationship between the first multi-core connector 10C and the second multi-core connector 20A. Two modules 1A having the identical structure are used as well as a polarity C wiring structure (such as a cable) that is a standard as an optical coupling medium is used, and thus interactive optical transmission and reception lines can be formed while the same optical wiring forms are provided on the modules 1A side with no use of special components.

As described above, the embodiments of the optical connector-equipped fiber connection structure, the module, and the assembly according to the present disclosure are described. However, the present disclosure is not limited to the foregoing embodiments and the forgoing examples, and various modifications are possible in the scope not deviating from the gist descried in claims. That is, the shapes, sizes, numbers, and placement forms of the components of the optical connector-equipped fiber connection structure, the module, and the assembly are appropriately changeable in the scope in which the above-described gist is not changed.

For example, in the foregoing embodiment, the optical connector-equipped fiber connection structure 30 provided on the module 1 is described. However, the shape, size, mounting form on the chassis, and any other parameter of the module on which the optical connector-equipped fiber connection structure is mounted are not limited to the above-described module 1, which are appropriately changeable. For example, the module is not limited to a module housed in one casing.

The assembly may be an assembly including a first module, a second module, and a polarity C wiring structure. The first module includes a first adapter to which a first multi-core connector of an optical connector-equipped fiber connection structure is connected, a first wall surface supporting the first adapters, a second adapter to which a second multi-core connector of the optical connector-equipped fiber connection structure is connected, a second wall surface supporting the second adapters, and an optical connector-equipped fiber connection structure configured to optically couple the first adapter to the second adapter. The second module includes another first adapter to which a first multi-core connector of another optical connector-equipped fiber connection structure is connected, a third wall surface supporting the first adapters, a second adapter to which a second multi-core connector of the other optical connector-equipped fiber connection structure is connected, a fourth wall surface supporting the second adapters, and an optical connector-equipped fiber connection structure configured to optically couple the first adapter to the second adapter. The polarity C wiring structure configured to optically couple the first module to the second module.

In the foregoing embodiment, the module 1 is described, including the first multi-core connectors 10A to 10F that are eight-core MPO connectors, the second multi-core connectors 20A and 20B that are 24-core MPO connectors, and the optical fiber F. However, the specifications of the optical connector are not limited to the MPO, which are appropriately changeable.

REFERENCE SIGNS LIST 1, 1A module
2 casing
2a first wall surface
2b second wall surface
2c projection
2e third wall surface
3, 3A, 3B, 3C, 3D, 3E, 3F first adapter
4, 4A, 4B second adapter
5 nylon latch
10A, 10B, 10C, 10D, 10E, 10F first multi-core connector
11, 21 ferrule
11a, 21a guide hole
11b, 21b optical fiber retention hole
20A, 20B second multi-core connector
30, 40 optical connector-equipped fiber connection structure
100, 100A assembly
C MPO cable
C1, C2 multi-core connector
C3 trunk cable
C4 round cord
D1 first direction
D2 second direction
D3 third direction
F, H optical fiber
G1 first group
G2 second group G3 third group
G4 fourth group
L line

The invention claimed is:

1. An optical connector-equipped fiber connection structure comprising:
a first multi-core connector;
a second multi-core connector; and
a plurality of optical fibers configured to connect the first multi-core connector to the second multi-core connector, wherein
the plurality of optical fibers has at least three groups including two or more of the optical fibers adjacent to each other in the first multi-core connector,
in each of the groups, two or more of the optical fibers extend from the first multi-core connector to the second multi-core connector without intersecting with each other,
the optical fibers of two groups of the at least three groups intersect with each other in a midway point going from the first multi-core connector to the second multi-core connector,
the optical fibers of a group other than the two groups extend from the first multi-core connector to the second multi-core connector without intersecting with other optical fibers extending from the first multi-core connector,
the at least three groups include a first group, a second group adjacent to the first group, a third group adjacent to the second group, and a fourth group adjacent to the third group,
the optical fibers of the first group and the optical fibers of the second group extend from the first multi-core connector to the second multi-core connector without intersecting with the other optical fibers extending from the first multi-core connector, and
the optical fibers of the third group and the optical fibers of the fourth group intersect with each other in a midway point going from the first multi-core connector to the second multi-core connector.

2. An optical connector-equipped fiber connection structure comprising:
a first multi-core connector;
a second multi-core connector; and
a plurality of optical fibers configured to connect the first multi-core connector to the second multi-core connector, wherein
the plurality of optical fibers has at least three groups including two or more of the optical fibers adjacent to each other in the first multi-core connector,
in the groups, two or more of the optical fibers extend from the first multi-core connector to the second multi-core connector without intersecting with each other,
the optical fibers of two groups of the at least three groups intersect with each other in a midway point going from the first multi-core connector to the second multi-core connector,
the optical fibers of a group other than the two groups extend from the first multi-core connector to the second multi-core connector without intersecting with other optical fibers extending from the first multi-core connector,
the at least three groups include a first group, a second group adjacent to the first group, a third group adjacent to the second group, and a fourth group adjacent to the third group,
the optical fibers of the first group extend from the first multi-core connector to the second multi-core connector without intersecting with the other optical fibers extending from the first multi-core connector,
the optical fibers of the second group intersect with the optical fibers of the third group in a midway point going from the first multi-core connector to the second multi-core connector and intersect with the optical fibers of the fourth group, and
the optical fibers of the third group and the optical fibers of the fourth group extend from the first multi-core connector to the second multi-core connector without intersecting with each other.

3. An optical connector-equipped fiber connection structure comprising:
a first multi-core connector;
a second multi-core connector; and
a plurality of optical fibers configured to connect the first multi-core connector to the second multi-core connector, wherein
the plurality of optical fibers is arrayed in two groups in the second multi-core connector,
the plurality of optical fibers has at least four groups including two or more of the optical fibers adjacent to each other in the first multi-core connector,
optical fibers of a first group and a fourth group in the first multi-core connector are arrayed at equal positions in groups different from each other in the second multi-core connector,
optical fibers of a second group and a third group in the first multi-core connector are arrayed at equal positions in groups different from each other in the second multi-core connector,
the first group, the second group, the third group, and the fourth group are adjacent to each other in this order, and
an order of arrangement of the optical fibers in each group of the first multi-core connector is the same as the order of arrangement of the optical fibers in the second multi-core connector.

4. The optical connector-equipped fiber connection structure according to claim 1, wherein
in the second multi-core connector, the plurality of optical fibers is arrayed along each of two lines,
the plurality of optical fibers arrayed on one line of the two lines does not intersect with the other optical fibers extending from the first multi-core connector in a midway point going from the first multi-core connector to the second multi-core connector, and
the plurality of optical fibers arrayed on another line of the two lines intersects with the other optical fibers extending from the first multi-core connector in a midway point going from the first multi-core connector to the second multi-core connector.

5. The optical connector-equipped fiber connection structure according to claim 1, wherein
the first multi-core connector has a plurality of optical fiber retention holes,
the optical fibers extending to the second multi-core connector is inserted into a part of optical fiber retention holes in the plurality of optical fiber retention holes, and
the optical fibers extending to the second multi-core connector is not inserted into remaining optical fiber retention holes in the plurality of optical fiber retention holes.

6. The optical connector-equipped fiber connection structure according to claim 1, wherein the optical fibers comprising eight optical fibers are connected to the first multi-core connector, and the optical fibers comprising 12×n (n is a natural number) optical fibers are connected to the second multi-core connector.

7. The optical connector-equipped fiber connection structure according to claim 1,
wherein the second multi-core connector is a 24-core MPO connector.

8. The optical connector-equipped fiber connection structure according to claim 1,
wherein the second multi-core connector includes two 12-core MPO connectors.

9. A module comprising:
a first adapter having a first multi-core connector of an optical connector-equipped fiber connection structure connected;
a first wall surface exposing and supporting the first adapter;
a second adapter having a second multi-core connector of the optical connector-equipped fiber connection structure connected;
a second wall surface exposing and supporting the second adapter; and
the optical connector-equipped fiber connection structure according to claim 1 configured to optically couple the first adapter to the second adapter.

10. The module according to claim 9, comprising:
a casing having the first wall surface, the second wall surface opposed to the first wall surface, and a third wall surface joining the first wall surface to the second wall surface, the casing being configured to house the optical connector-equipped fiber connection structure.

11. An assembly comprising:
the module according to claim 9; and
a polarity C wiring structure configured to optically couple the module to another module.

12. The optical connector-equipped fiber connection structure according to claim 3, wherein
in the second multi-core connector, the plurality of optical fibers is arrayed along each of two lines,
the plurality of optical fibers arrayed on one line of the two lines does not intersect with other optical fibers extending from the first multi-core connector in a midway point going from the first multi-core connector to the second multi-core connector, and
the plurality of optical fibers arrayed on another line of the two lines intersects with the other optical fibers extending from the first multi-core connector in a midway point going from the first multi-core connector to the second multi-core connector.

13. The optical connector-equipped fiber connection structure according to claim 3, wherein
the first multi-core connector has a plurality of optical fiber retention holes,
the optical fibers extending to the second multi-core connector is inserted into a part of optical fiber retention holes in the plurality of optical fiber retention holes, and
the optical fibers extending to the second multi-core connector is not inserted into remaining optical fiber retention holes in the plurality of optical fiber retention holes.

14. The optical connector-equipped fiber connection structure according to claim 3, wherein
the optical fibers comprising eight optical fibers are connected to the first multi-core connector, and
the optical fibers comprising 12×n (n is a natural number) optical fibers are connected to the second multi-core connector.

15. The optical connector-equipped fiber connection structure according to claim 3,
wherein the second multi-core connector is a 24-core MPO connector.

16. The optical connector-equipped fiber connection structure according to claim 3,
wherein the second multi-core connector includes two 12-core MPO connectors.

17. A module comprising:
a first adapter having a first multi-core connector of an optical connector-equipped fiber connection structure connected;
a first wall surface exposing and supporting the first adapter;
a second adapter having a second multi-core connector of the optical connector-equipped fiber connection structure connected;
a second wall surface exposing and supporting the second adapter; and
the optical connector-equipped fiber connection structure according to claim 3 configured to optically couple the first adapter to the second adapter.

18. The module according to claim 17, comprising:
a casing having the first wall surface, the second wall surface opposed to the first wall surface, and a third wall surface joining the first wall surface to the second wall surface, the casing being configured to house the optical connector-equipped fiber connection structure.

19. An assembly comprising:
the module according to claim 17, and a polarity C wiring structure configured to optically couple the module to another module.

20. The assembly according to claim 11, comprising:
a plurality of modules, wherein
the module is one of the plurality of modules, and
the polarity C wiring structure is configured to optically couple the plurality of modules to each other.

21. The assembly according to claim 19, comprising:
a plurality of modules, wherein
the module is one of the plurality of modules, and
the polarity C wiring structure is configured to optically couple the plurality of modules to each other.

22. The optical connector-equipped fiber connection structure according to claim 2, wherein
in the second multi-core connector, the plurality of optical fibers is arrayed along each of two lines,
the plurality of optical fibers arrayed on one line of the two lines does not intersect with the other optical fibers extending from the first multi-core connector in a midway point going from the first multi-core connector to the second multi-core connector, and
the plurality of optical fibers arrayed on another line of the two lines intersects with the other optical fibers extending from the first multi-core connector in a midway point going from the first multi-core connector to the second multi-core connector.

23. The optical connector-equipped fiber connection structure according to claim 2, wherein
the first multi-core connector has a plurality of optical fiber retention holes,
the optical fibers extending to the second multi-core connector is inserted into a part of optical fiber retention holes in the plurality of optical fiber retention holes, and the optical fibers extending to the second multi-core connector is not inserted into remaining optical fiber retention holes in the plurality of optical fiber retention holes.

24. The optical connector-equipped fiber connection structure according to claim 2, wherein
the optical fibers comprising eight optical fibers are connected to the first multi-core connector, and
the optical fibers comprising 12×n (n is a natural number) optical fibers are connected to the second multi-core connector.

25. The optical connector-equipped fiber connection structure according to claim 2,
wherein the second multi-core connector is a 24-core MPO connector.

26. The optical connector-equipped fiber connection structure according to claim 2,
wherein the second multi-core connector includes two 12-core MPO connectors.

27. A module comprising:
a first adapter having a first multi-core connector of optical connector-equipped fiber connection structure connected;
a first wall surface exposing and supporting the first adapter;
a second adapter having a second multi-core connector of the optical connector-equipped fiber connection structure connected;
a second wall surface exposing and supporting the second adapter; and
the optical connector-equipped fiber connection structure according to claim 3 configured to optically couple the first adapter to the second adapter.

28. The module according to claim 27, comprising:
a casing having the first wall surface, the second wall surface opposed to the first wall surface, and a third wall surface joining the first wall surface to the second wall surface, the casing being configured to house the optical connector-equipped fiber connection structure.

29. An assembly comprising:
the module according to claim 27; and
a polarity C wiring structure configured to optically couple the module to another module.

30. The assembly according to claim 29, comprising:
a plurality of modules, wherein
the module is one of the plurality of modules, and
the polarity C wiring structure is configured to optically couple the plurality of modules to each other.

31. An assembly comprising:
a module; and
a polarity C wiring structure configured to optically couple the module to another module,
the module comprising:
a first adapter having a first multi-core connector of an optical connector-equipped fiber connection structure connected;
a first wall surface exposing and supporting the first adapter;
a second adapter having a second multi-core connector of the optical connector-equipped fiber connection structure connected;
a second wall surface exposing and supporting the second adapter; and
an optical connector-equipped fiber connection structure configured to optically couple the first adapter to the second adapter,
the optical connector-equipped fiber connection structure comprising:
a first multi-core connector;
a second multi-core connector; and
a plurality of optical fibers configured to connect the first multi-core connector to the second multi-core connector, wherein
the plurality of optical fibers has at least three groups including two or more of the optical fibers adjacent to each other in the first multi-core connector,
in the groups, two or more of the optical fibers extend from the first multi-core connector to the second multi-core connector without intersecting with each other,
the optical fibers of two groups of the at least three groups intersect with each other in a midway point going from the first multi-core connector to the second multi-core connector, and
the optical fibers of a group other than the two groups extend from the first multi-core connector to the second multi-core connector without intersecting with other optical fibers extending from the first multi-core connector.

32. The assembly according to claim 31, comprising:
a plurality of modules, wherein
the module is one of the plurality of modules, and
the polarity C wiring structure is configured to optically couple the plurality of modules to each other.

33. An assembly comprising:
a module; and
a polarity C wiring structure configured to optically couple the module to another module,
the module comprising:
a first adapter having a first multi-core connector of an optical connector-equipped fiber connection structure connected;
a first wall surface exposing and supporting the first adapter;
a second adapter having a second multi-core connector of the optical connector-equipped fiber connection structure connected;
a second wall surface exposing and supporting the second adapter; and
an optical connector-equipped fiber connection structure configured to optically couple the first adapter to the second adapter, and
the optical connector-equipped fiber connection structure comprising:
a first multi-core connector;
a second multi-core connector; and
a plurality of optical fibers configured to connect the first multi-core connector to the second multi-core connector, wherein
the plurality of optical fibers is arrayed in two groups in the second multi-core connector,
the plurality of optical fibers has at least four groups including two or more of the optical fibers adjacent to each other in the first multi-core connector,
optical fibers of a first group and a fourth group in the first multi-core connector are arrayed at equal positions in groups different from each other in the second multi-core connector, and
optical fibers of a second group and a third group in the first multi-core connector are arrayed at equal positions in groups different from each other in the second multi-core connector.

34. The assembly according to claim 33, comprising:
a plurality of modules, wherein
the module is one of the plurality of modules, and
the polarity C wiring structure is configured to optically couple the plurality of modules to each other.

* * * * *